United States Patent
Johansson et al.

(10) Patent No.: US 9,949,213 B2
(45) Date of Patent: Apr. 17, 2018

(54) PHYSICAL DOWNLINK CONTROL CHANNEL POWER COORDINATION

(71) Applicant: Telefonaktiebolaget LM Ericsson (publ), Stockholm (SE)

(72) Inventors: Anders Johansson, Hässelby (SE); Jawad Manssour, Seoul (KR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 32 days.

(21) Appl. No.: 15/038,859

(22) PCT Filed: Dec. 3, 2013

(86) PCT No.: PCT/SE2013/051441
§ 371 (c)(1),
(2) Date: May 24, 2016

(87) PCT Pub. No.: WO2015/084222
PCT Pub. Date: Jun. 11, 2015

(65) Prior Publication Data
US 2017/0055230 A1    Feb. 23, 2017

(51) Int. Cl.
H04W 52/32    (2009.01)
H04W 72/04    (2009.01)

(52) U.S. Cl.
CPC ....... H04W 52/325 (2013.01); H04W 72/042 (2013.01)

(58) Field of Classification Search
None
See application file for complete search history.

(56) References Cited

U.S. PATENT DOCUMENTS 9,392,593 B2 *   7/2016   Jiang ............... H04W 52/325
2011/0194524 A1 * 8/2011   Hedlund ............ H04L 5/0053
                                                          370/329

FOREIGN PATENT DOCUMENTS

WO    2012/155735 A1    11/2012

OTHER PUBLICATIONS

LTE/3GPP; "3rd Generation Partnership Project; Technical Specification Group Radio Access Network; Evolved Universal Terrestrial Radio Access (E-UTRA); Physical Channels and Modulation (Release 10)"; 3GPP TS 36.211 V10.7.0 (Feb. 2013) Technical Specification; Feb. 2013; pp. 1-101.

(Continued)

*Primary Examiner* — Hong Cho
(74) *Attorney, Agent, or Firm* — Patent Portfolio Builders PLLC

(57) ABSTRACT

There is provided physical downlink control channel (PDCCH) power coordination. A first transmission point (TP1) and a second transmission point (TP2) are associated with a common physical cell identity (PCI). TP1 and TP2 are controlled by a network node. The network node schedules a first user equipment (UE1) on a first PDCCH allocating a first set of control channel elements (CCEs). TP1 and TP2 adjust power on at least one CCE in the first set of CCEs allocated to UE1. TP1 adjusts power on at least one CCE in a second set of CCEs. The second set of CCEs is allocatable by a second PDCCH for the network node to schedule at least a second user equipment (UE2). TP1 and TP2 decrease the number of CCEs in the first set of CCEs allocated to UE1.

20 Claims, 6 Drawing Sheets

(56) References Cited

OTHER PUBLICATIONS

LTE/3GPP; "3rd Generation Partnership Project; Technical Specification Group Radio Access Network; Evolved Universal Terrestrial Radio Access (E-UTRA); Multiplexing and channel coding (Release 10)"; 3GPP TS 36.212 V10.8.0 (Jun. 2013) Technical Specification; Jun. 2013; pp. 1-79.
LTE/3GPP; "3rd Generation Partnership Project; Technical Specification Group Radio Access Network; Evolved Universal Terrestrial Radio Access (E-UTRA); Physical layer procedures (Release 10)"; 3GPP TS 36.213 V10.11.0 (Dec. 2012) Technical Specification; Dec. 2013; pp. 1-127.
International Search Report in related International Application No. PCT/SE2013/051441, dated Mar. 20, 2014.
Written Opinion of the International Searching Authority in related International Application No. PCT/SE2013/051441, dated Mar. 20, 2014.
Apple Inc: "On the Structure and Usage Scenarios of ePDCCH", 3GPP Draft; R1-114300, 3rd Generation Partnership Project (EGPP), Mobile Competence Centre; 650, Route Des Lucioles; F-06921 Sophia-Antipolis Cedex; France, vol. RAN WG 1, Meeting #67, San Francisco, USA; 20111115-20111118, Nov. 9, 2011, pp. 1-9.

\* cited by examiner

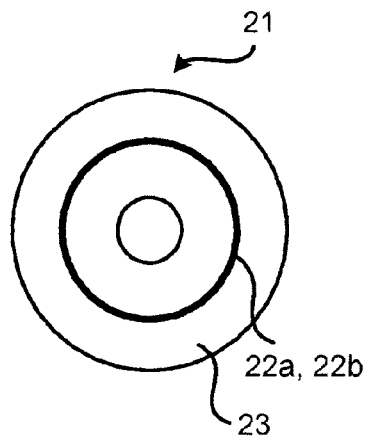
Fig. 5
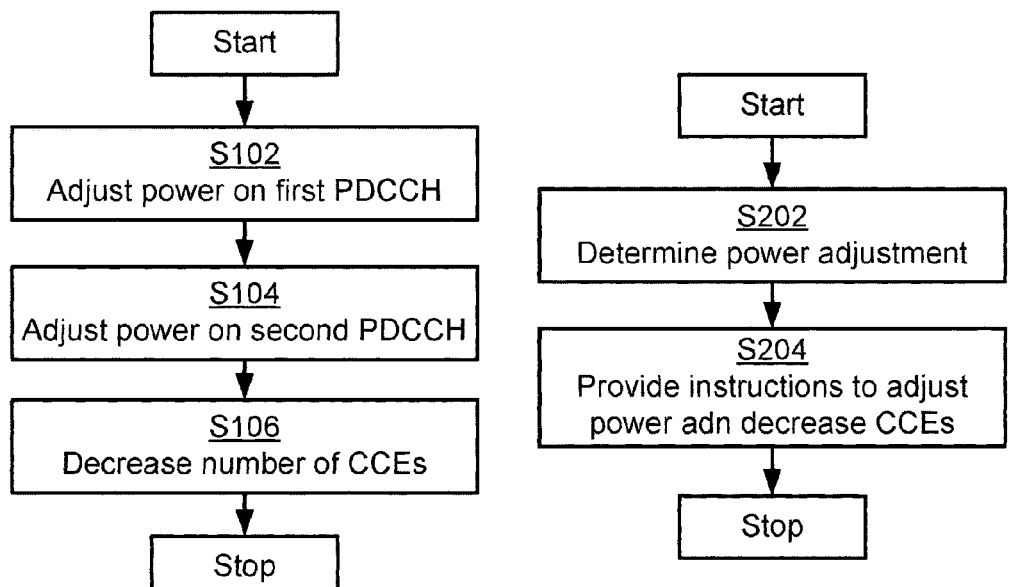
Fig. 6a
Fig. 7a

PHYSICAL DOWNLINK CONTROL CHANNEL POWER COORDINATION

TECHNICAL FIELD

Embodiments presented herein relate to physical downlink control channel power coordination, and particularly to a method, a system, a network node, computer programs, and a computer program product for physical downlink control channel power coordination between a first transmission point and a second transmission point.

BACKGROUND

In mobile communication networks, there is a challenge to obtain good performance and capacity for a given communications protocol, its parameters and the physical environment in which the mobile communication network is deployed.

One performance and capacity parameter of the communication network relates to utilization of orthogonal time/frequency resources (inter alia Orthogonal Frequency Division Multiplexing (OFDM) in the downlink (DL) and Single Carrier Frequency Division Multiple Access (SCFDMA) in the uplink (UL)). Certain utilization of the orthogonal time/frequency resources may allow scheduling multiple user equipment (UE), at the same time over the operating bandwidth without creating any intra-cell interference (particularly when assuming that spatial multiplexing or multi-user multiple-input and multiple-output (MU-MIMO) mechanisms are not used).

In order to schedule UEs, whether in DL or in UL, the UEs should be informed on which frequency resources they are expected to transmit/receive data, which Modulation and Coding Scheme (MCS) to use, etc.

In mobile communication networks based on the Long Term Evolution (LTE) telecommunications standard this may be accomplished by means of the physical downlink control channel (PDCCH). In LTE the PDCCH is typically broadcasted every millisecond over the first one, two or three OFDM symbols (out of the 14 OFDM symbols transmitted every millisecond, assuming a normal cyclic prefix). The PDCCH assignments to the UE are encapsulated into control channel elements (CCE) whose purpose is mainly to simplify the search for the UE on the PDCCH.

The PDCCH is transmitted in the control region, typically the first one, two or three symbols of a subframe, using 1, 2, 4, or 8 CCEs. The number of CCEs selected for a PDCCH depends on the Downlink Control Information (DCI) format and coding rate, i.e. the link adaptation for PDCCH. Each CCE consists of 36 Resource Elements (RE). The size of CCE-space is between 1 and 88 CCEs depending on downlink system bandwidth, number of antenna ports, Control Format Indicator (CFI), physical hybrid automatic repeat request indicator channel (PHICH) resources size, cyclic prefix size and Time Division Duplex/Frequency Division Duplex (TDD/FDD) configuration.

PDCCH is a resource shared by both UL and DL UEs. As a consequence thereof the PDCCH needs to be large enough (i.e. occupy enough bandwidth and/or other resources) to schedule a plurality of UEs in every Transmission Time Interval (TTI) in case of a plurality of simultaneously active UEs. At the same time, a larger PDCCH results in a smaller physical downlink shared channel (PDSCH) as they both share the same resources, which in turn thus implies fewer resources to be available for transmission of the actual payload data in the DL. This may thus further imply losses in both peak throughput and cell capacity to be caused.

One concept in particular that requires efficient usage of PDCCH is the "shared cell" concept. In all simplicity, the shared cell concept refers to configuring two adjacent cells with the same Physical Cell Identity (PCI). One of the main advantages of this concept is avoiding handover between the adjacent cells sharing the same PCI as these cells will appear as one single cell for the UE.

In shared cell deployments, the PDCCH can easily become a bottleneck. A proper handling of PDCCH power may provide a high capacity for the PDCCH (i.e. have enough UL grants for scheduling uplink users and DL assignments for scheduling downlink users) without compromising the performance for UEs at the cell-edge, especially as these UEs are expected to reap the benefits of a shared cell deployment. Conventional solutions, especially for legacy systems (i.e. pre-Release 10 and 11 of LTE) have one of two options. A first option involves reusing the PDCCH in cells with the same PCI. This has the advantage of potentially high capacity but it has also the main limitation of severely degrade the PDCCH, especially for UEs at the cell-edges since at the cell-edges UEs may receive DL signalling from an adjacent cell. A second option involves using a common (or shared) PDCCH in cells with the same PCI. This has the advantage of protecting UEs at cell-edges at the expense of a limited capacity since the PDCCH are shared over more than one cell. This limitation becomes more significant for increasing number of cells with the same PCI.

Hence, there is still a need for an improved handling of PDCCH power in shared cell scenarios.

SUMMARY

An object of embodiments herein is to provide improved handling of PDCCH power in shared cell scenarios.

According to a first aspect there is presented a method for physical downlink control channel (PDCCH) power coordination. The method is performed by a first transmission point (TP1) and a second transmission point (TP2). TP1 and TP2 are associated with a common physical cell identity (PCI). TP1 and TP2 are controlled by a network node. The network node schedules a first user equipment (UE1) on a first PDCCH allocating a first set of control channel elements (CCEs). The method comprises adjusting, by TP1 and TP2, power on at least one CCE in the first set of CCEs allocated to UE1. The method comprises adjusting, by TP1, power on at least one CCE in a second set of CCEs. The second set of CCEs is allocatable by a second PDCCH for the network node to schedule at least a second user equipment (UE2). The method comprises decreasing, by TP1 and TP2, number of CCEs in the first set of CCEs allocated to UE1.

Advantageously this PDCCH power coordination provides improved handling of PDCCH power in shared cell scenarios.

Advantageously this PDCCH power coordination provides efficient PDCCH power allocation when shared cells are utilized.

Advantageously this PDCCH power coordination does not require specific UE support and can thus be applied to both legacy UEs (i.e., pre-Release in) and new UEs.

Advantageously this PDCCH power coordination provides increased DL peak rate and capacity since less OFDM symbols would be needed for the control channel.

Advantageously this PDCCH power coordination provides reduced interference.

Advantageously, since more CCEs are made available, this PDCCH power coordination provides increased PDCCH capacity, thus allowing more UEs to be scheduled.

According to a second aspect there is presented a system for PDCCH power coordination. The system comprises a first transmission point (TP1) and a second transmission point (TP2). TP1 and TP2 are associated with a common physical cell identity (PCI). TP1 and TP2 are arranged to be controlled by a network node. The network node is arranged to schedule a first user equipment (UE) on a first PDCCH allocating a first set of control channel elements (CCEs). TP1 and TP2 each comprise a processing unit. The processing units of TP1 and TP2 are arranged to adjust power on at least one CCE in the first set of CCEs allocated to UE1. The processing unit of TP1 is arranged to adjust power on at least one CCE in a second set of CCEs. The second set of CCEs is allocatable by a second PDCCH for the network node to be able to schedule at least a second user equipment (UE2). The processing units of TP1 and TP2 are arranged to decrease number of CCEs in the first set of CCEs allocated to UE.

According to a third aspect there is presented a computer program for PDCCH power coordination, the computer program comprising computer program code which, when run on a first transmission point and a second transmission point, causes the first transmission point and the second transmission point to perform a method according to the first aspect.

According to a fourth aspect there is presented a method for physical downlink control channel (PDCCH) power coordination of a first transmission point (TP1) and a second transmission point (TP2). The method is performed by the network node. TP1 and TP2 are associated with a common physical cell identity (PCI). TP1 and TP2 are controlled by a network node. The network node schedules a first user equipment (UE) on a first PDCCH allocating a first set of control channel elements (CCEs). The method comprises determining power adjustment of UE1 and at least a second user equipment (UE2). The method comprises providing TP1 and TP2 with instructions. The instructions comprise to adjust, by TP1 and TP2, power on at least one CCE in the first set of CCEs allocated to UE1. The instructions comprise to adjust, by TP1, power on at least one CCE in a second set of CCEs. The second set of CCEs is allocatable by a second PDCCH for the network node to schedule at least UE2. The instructions comprise to decrease, by TP1 and TP2, number of CCEs in the first set of CCEs allocated to UE1.

According to a fifth aspect there is presented a network node for physical downlink control channel (PDCCH) power coordination of a first transmission point (TP1) and a second transmission point (TP2). TP1 and TP2 are associated with a common physical cell identity (PCI). TP1 and TP2 are controlled by the network node. The network node is arranged to schedule a first user equipment (UE) on a first PDCCH allocating a first set of control channel elements (CCEs). The network node comprises a processing unit. The processing unit is arranged to determine power adjustment of UE1 and at least a second user equipment (UE2). The processing unit is arranged to provide TP1 and TP2 with instructions. The instructions comprise to adjust, by TP1 and TP2, power on at least one CCE in the first set of CCEs allocated to UE1. The instructions comprise to adjust, by TP1, power on at least one CCE in a second set of CCEs. The second set of CCEs is allocatable by a second PDCCH for the network node to schedule at least UE2. The instructions comprise to decrease, by TP1 and TP2, number of CCEs in the first set of CCEs allocated to UE1.

According to a sixth aspect there is presented a computer program for PDCCH power coordination, the computer program comprising computer program code which, when run on a network node, causes the network node to perform a method according to the fourth aspect.

According to a seventh aspect there is presented a computer program product comprising a computer program according to at least one of the third aspect and the sixth aspect and a computer readable means on which the computer program is stored.

It is to be noted that any feature of the first, second, third, fourth, fifth, sixth and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached dependent claims as well as from the drawings.

BRIEF DESCRIPTION OF THE DRAWINGS

The inventive concept is now described, by way of example, with reference to the accompanying drawings, in which:

FIG. 5 shows one example of a computer program product comprising computer readable means according to an embodiment; and FIGS. 6a, 6b, 7a, 7b, and 8 are flowcharts of methods according to embodiments.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
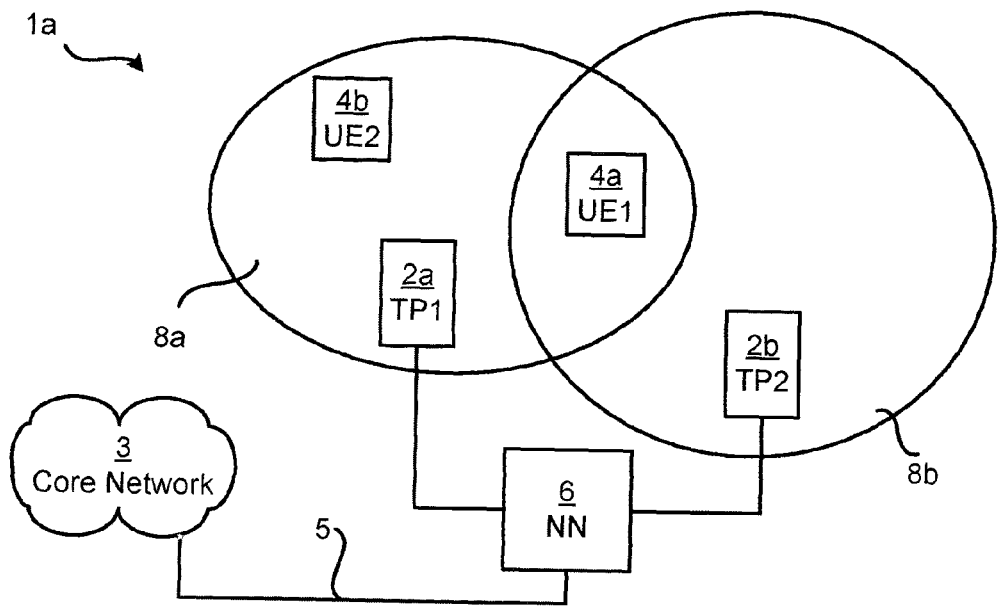
FIGS. 1 and 2 are schematic diagrams illustrating communication networks according to embodiments.
Figure 2:
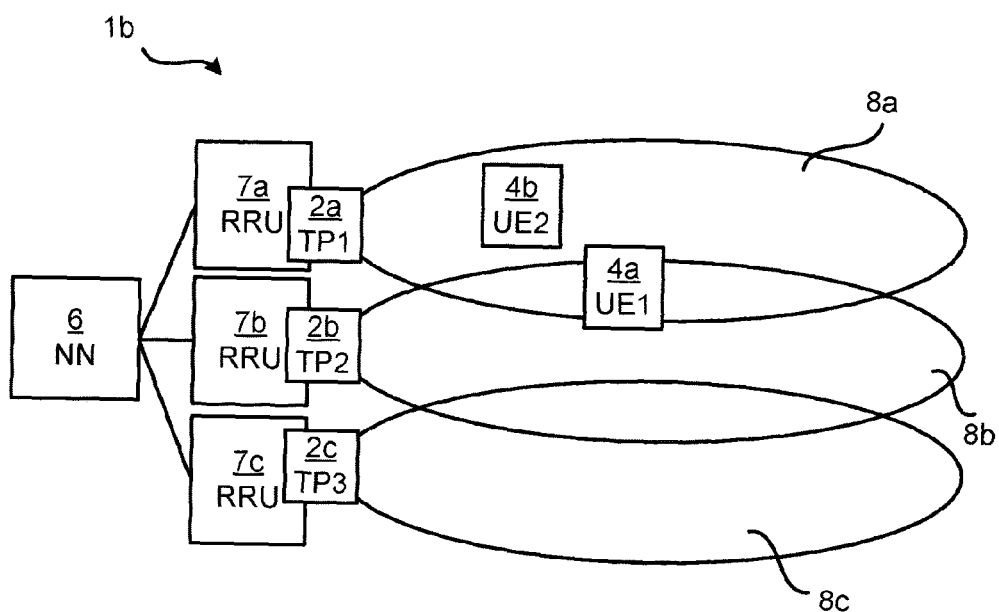

FIGS. 1 and 2 are schematic diagrams illustrating communication networks 1a, 1b, where embodiments presented herein can be applied. The communications network 1a of FIG. 1 comprises a core network 3. The core network 3 offers telecommunications services to the user equipment (UE) 4a, 4b. In general term the UE 4a, 4b may be a mobile terminal, a user terminal, a user agent, a mobile phone, a terminal device, a communications device, etc. In order for the UE 4a, 4b to access the telecommunications services offered by the core network 3, the UE 4a, 4b are arranged to communicate with at least one transmission point (TP) 2a, 2b and/or a network node (NN) 6 e.g. acting as a radio base station (RBS). The transmission point 2a, 2b provides network coverage in areas, defining cells, 8a, and 8b, respectively. The transmission points 2a, 2b are operatively connected to the network node 6 which in turn is operatively connected to the core network 3 as schematically illustrated at reference 5. Although not illustrated in FIG. 1, there may in addition be one or more other (types of) network nodes in between the core network 3 and the network node 6. As is understood, the communication system 1a may generally comprise a plurality of network nodes 6, a plurality of transmission points 2a, 2b and a plurality of UE 4a, 4b.

The communications network 1b of FIG. 2 is similar to the communications network 1a of FIG. 1. In comparison, the communications network 1b additionally comprises remote radio units (RRU) 7a, 7b, 7c to each of which a corresponding transmission point 2a, 2b, 2C is operatively coupled. Each transmission point 2a, 2b, 2c may be part of one RRU 7a, 7b, 7c which in turn is coupled to the network node 6. Alternatively, according to embodiments one of the first transmission point 2a and the second transmission point 2b is located at the network node 6. In FIG. 2 also the cells 8a, 8b, 8c, of each transmission point 2a, 2b, 2c are illustrated.

In general terms, one transmission point may correspond to one antenna port set, i.e., one set of antennas at a network node (as in FIG. 1) or one set of antennas at an RRU (as in FIG. 2).

The communication networks 1a, 1b of FIGS. 1 and 2 may generally comply with any one or a combination of LTE (Long Term Evolution), EDGE (Enhanced Data Rates for GSM Evolution, GPRS (General Packet Radio Service)), CDMA2000 (Code Division Multiple Access 2000), WiMAX (Worldwide Interoperability for Microwave Access), etc., as long as the principles described hereinafter are applicable. According to embodiments the communication networks 1a and 1b of FIGS. 1 and 2 are compliant with the Evolved Universal Terrestrial Radio Access Network (E-UTRAN). Typically the E-UTRAN consists only of network nodes 6 in the form of eNodeBs (E-UTRAN NodeB, also known as Evolved NodeB) on the network side.

The embodiments disclosed herein relate to efficient utilization of the LTE Physical Downlink Control Channel (PDCCH) enabling PDCCH power coordination when shared cells (i.e. cells with same Physical Cell Identity, PCI) are used.

The inventors of the enclosed embodiments have through a combination of practical experimentation and theoretical derivation discovered that one challenge with practical implementation of the shared cell is how the PDCCH should be utilized as this latter could become the limiting resource. In particular, power allocation from the different transmission points to the different UEs is non-trivial, yet it may provide increase of the PDCCH capacity. The inventors of the enclosed embodiments have realized that known mechanisms for PDCCH utilization assume equal power allocation on PDCCH from the different transmission points and do not take into account the UEs' radio channel towards the different transmission points.

Particularly, there is provided coordination of PDCCH power assignments in a multi-sector cell from the different transmission points to different UEs with the aim of improving and/or increasing PDCCH capacity. In order to obtain efficient PDCCH power coordination there is provided a network node 6 and a system comprising at least a first transmission point 2a and a second transmission point, methods performed by the network node 6 ?in the system, computer programs comprising code, for example in the form of a computer program product, that when run on at least one of the network node 6, the first transmission point 2a, and the second transmission point 2b, causes the at least one of the network node 6, the first transmission point 2a, and the second transmission point 2b to perform the methods.

Figure 3A:
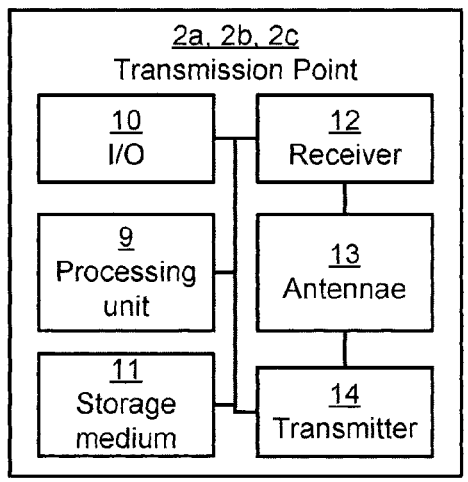
FIG. 3a is a schematic diagram showing functional modules of a transmission point according to an embodiment.

FIG. 3a schematically illustrates, in terms of a number of functional modules, the components of a transmission point 2a, 2b, 2c. The transmission point 2a, 2b, 2C takes the role of the first transmission point 2a (TP1), the second transmission point 2b (TP2) and the third transmission point 2c (TP3). A processing unit 9 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 21 (as in FIG. 5), e.g. in the form of a storage medium 11. Thus the processing unit 9 is thereby arranged to execute methods as herein disclosed. The storage medium 11 may also comprise persistent storage, which, for example, can be any single one or combination of magnetic memory, optical memory, solid state memory or even remotely mounted memory. The transmission point 2a, 2b, 2c may further comprise an input/output (I/O) interface 10 for receiving and providing information to a network node 6. The transmission point 2a, 2b, 2C also comprises one or more transmitters 14 and receivers 12, comprising analogue and digital components and a suitable number of antennae 13 for radio communication with a UE 4a, 4b. The processing unit 9 controls the general operation of the transmission point 2a, 2b, 2c, e.g. by sending control signals and data to the storage medium 11, the I/O interface 10, the transmitter 14 and/or the receiver 12 and receiving reports from the I/O interface 10, transmitter 14 and/or receiver 12 of its operation as well as retrieving instructions and data from the storage medium 11. Other components, as well as the related functionality, of the transmission point 2a, 2b, 2c are omitted in order not to obscure the concepts presented herein.

Figure 3B:
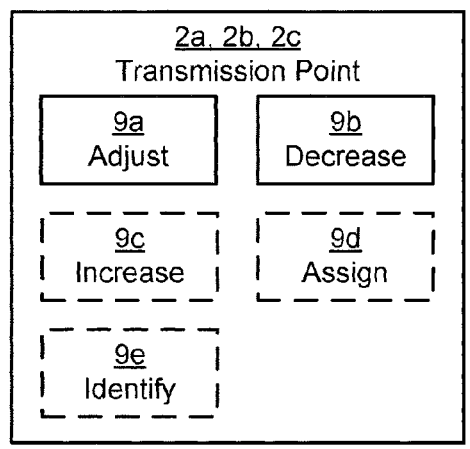
FIG. 3b is a schematic diagram showing functional units of a transmission point according to an embodiment.

FIG. 3b schematically illustrates, in terms of a number of functional units, the components of a transmission point 2a, 2b, 2c according to an embodiment. The transmission point 2a, 2b, 2c of FIG. 2b comprises a number of functional units; an adjust unit 9a, a decrease unit 9b. The transmission point 2a, 2b, 2C of FIG. 3b may further comprise a number of optional functional units, such as any of an increase unit 9c, an assign unit 9d, and an identify unit 9e. The functionality of each functional unit 9a-e will be further disclosed below in the context of which the functional units may be used. In general terms, each functional unit 9a-e may be implemented in hardware or in software. The processing unit 9 may thus be arranged to from the storage medium 11 fetch instructions as provided by a functional unit 9a-e and to execute these instructions, thereby performing any steps as will be disclosed hereinafter.

Figure 4A:
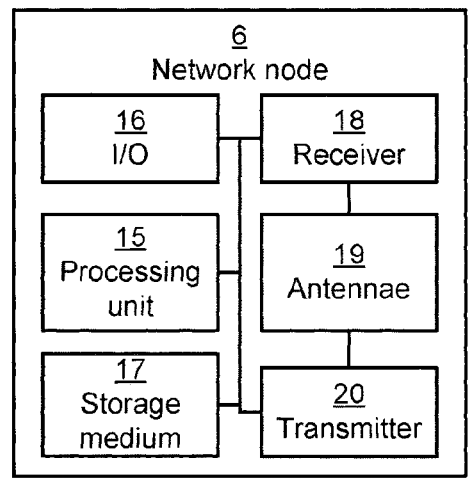
FIG. 4a is a schematic diagram showing functional modules of a network node according to an embodiment.

FIG. 4a schematically illustrates, in terms of a number of functional modules, the components of a network node 6. A processing unit 15 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 21 (as in FIG. 5), e.g. in the form of a storage medium 17. Thus the processing unit 15 is thereby arranged to execute methods as herein disclosed. The storage medium 17 may also comprise persistent storage, which, for example, can be any single one or combination of magnetic memory, optical memory, solid state memory or even remotely mounted memory. The network node 6 may further comprise an input/output (I/O) interface 16 for receiving and providing information to a transmission point 2a, 2b, 2c, a remote radio unit (RRU) 7a, 7b, 7c and/or a core network 3. The network node 6 may also comprise one or more transmitters 20 and receivers 18, comprising analogue and digital components and a suitable number of antennae 19 for radio communication with a UE 4a, 4b. The processing unit 15 controls the general operation of the network node 6, e.g. by sending signals and data to the storage medium 17, the I/O interface 16, the transmitter 20 and/or the receiver 18 and receiving reports from the I/O interface 16, transmitter 20 and/or receiver 18 of its operation as well as retrieving instructions and data from the storage medium 17. Other components, as well as the related functionality, of the network node 6 are omitted in order not to obscure the concepts presented herein.

Figure 4B:
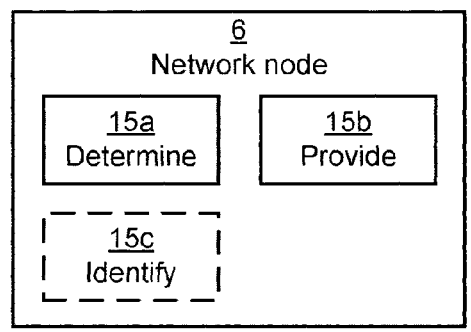
FIG. 4b is a schematic diagram showing functional units of a network node according to an embodiment.

FIG. 4b schematically illustrates, in terms of a number of functional units, the components of a network node 6 according to an embodiment. The network node 6 of FIG. 4b comprises a number of functional units; a determine unit 15a and a provide unit 15b. The network node 6 of FIG. 4b may further comprises a number of optional functional units, such as an identify unit 15c. The functionality of each functional unit 15a-c will be further disclosed below in the context of which the functional units may be used. In general terms, each functional unit 15a-c may be implemented in hardware or in software. The processing unit 15 may thus be arranged to from the storage medium 17 fetch instructions as provided by a functional unit 15a-c and to execute these instructions, thereby performing any steps as will be disclosed hereinafter.

Figure 6B:
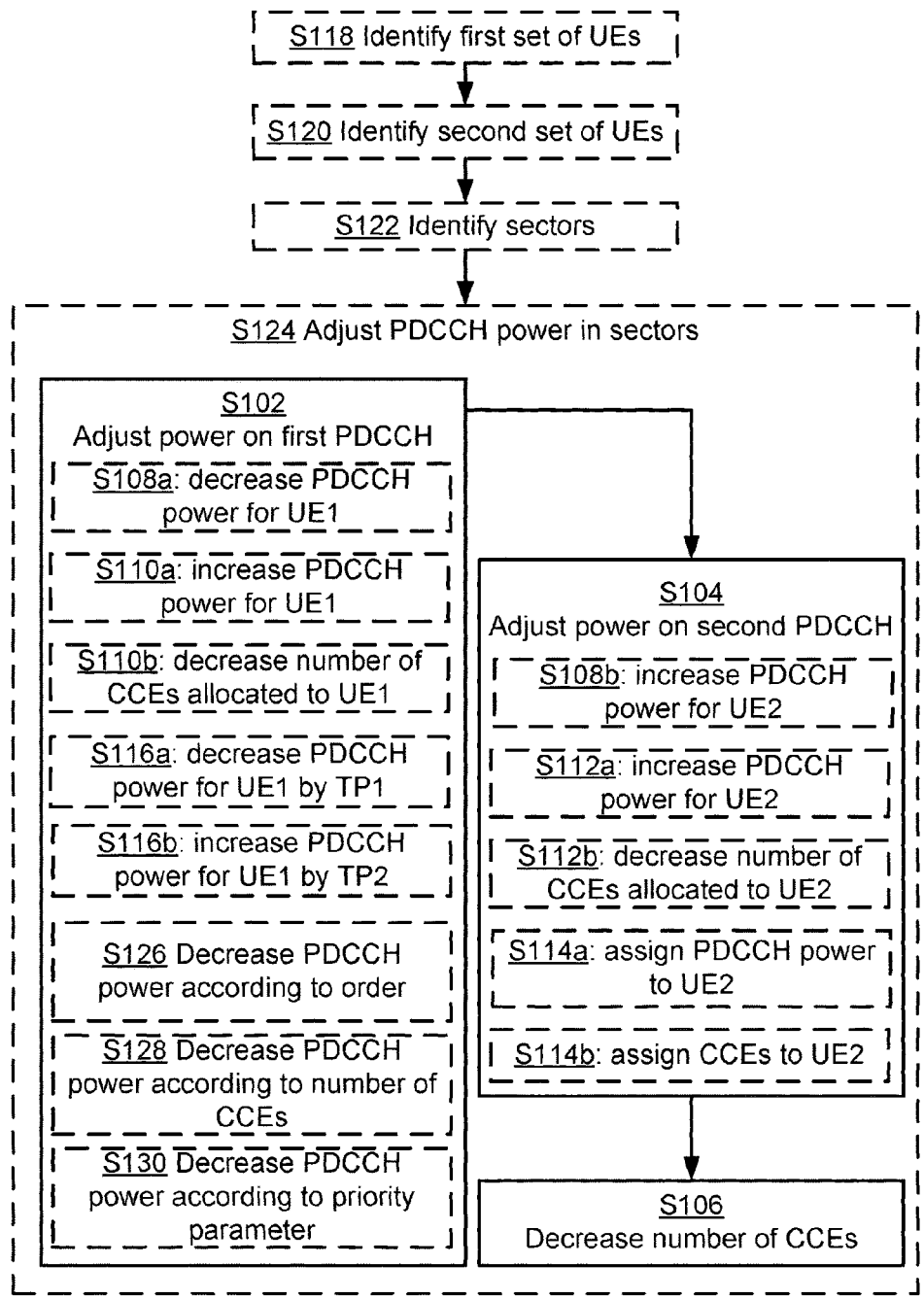
Figure 7B:
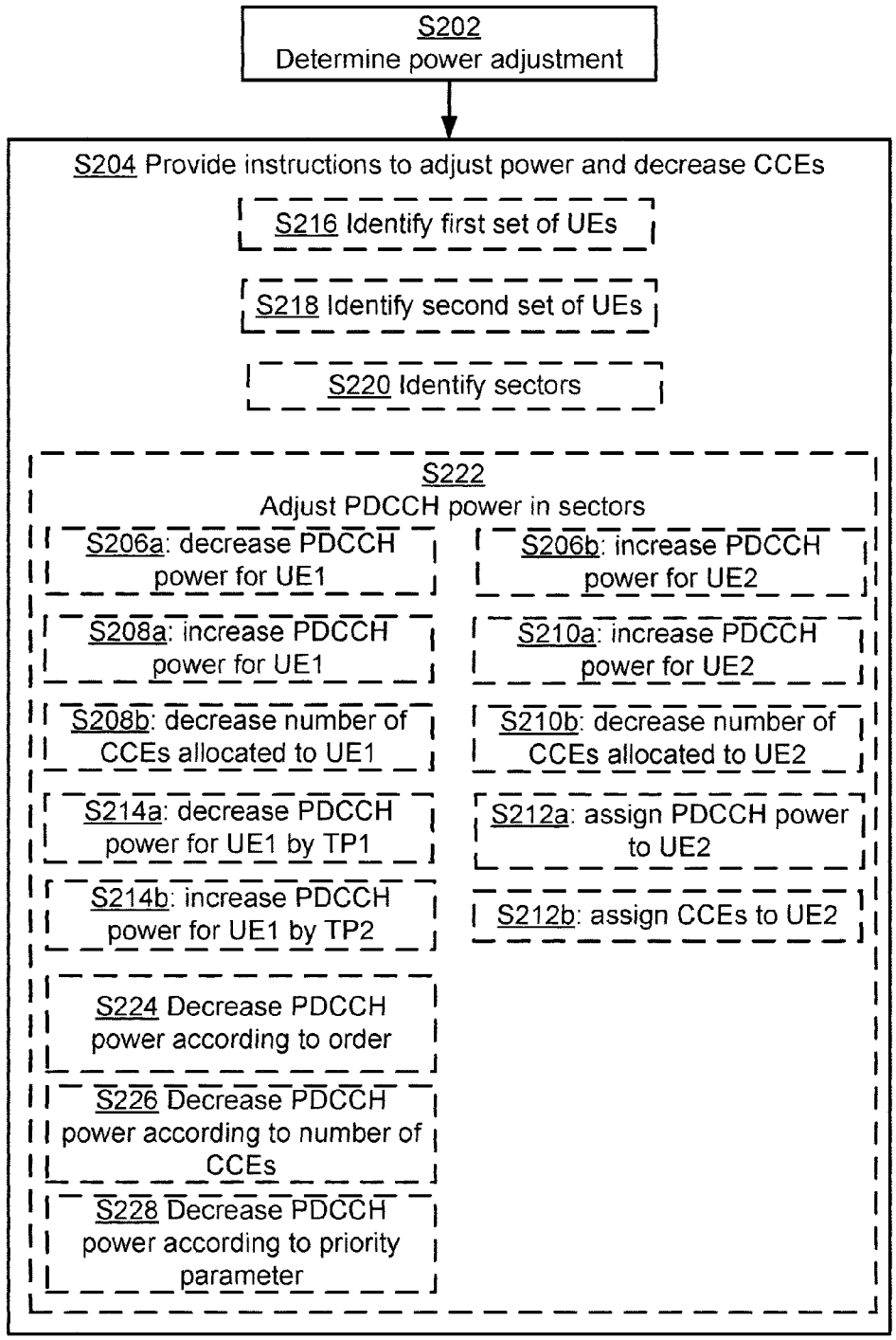

FIGS. 6a and 6b are flow charts illustrating embodiments of methods for PDCCH power coordination as performed by TP1 and TP2. FIGS. 7a and 7b are flow charts illustrating embodiments of methods for PDCCH power coordination as performed by the network node 6. The methods are advantageously provided as computer programs 22a, 22b. FIG. 5 shows one example of a computer program product 21 comprising computer readable means 23. On this computer readable means 23, a computer program 22a, 22b can be stored, which computer program 22a can cause the processing unit 9 and thereto operatively coupled entities and devices, such as the communications interface 10 and the storage medium 11 to execute methods according to embodiments described herein, and which computer program 22b can cause the processing unit 15 and thereto operatively coupled entities and devices, such as the communications interface 16 and the storage medium 17 to execute methods according to embodiments described herein. The computer program 22a, 22b and/or computer program product 21 may thus provide means for performing any steps as herein disclosed.

In the example of FIG. 5, the computer program product 21 is illustrated as an optical disc, such as a CD (compact disc) or a DVD (digital versatile disc) or a Blu-Ray disc. The computer program product 21 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory.

Thus, while the computer program 22a, 22b is here schematically shown as a track on the depicted optical disk, the computer program 22a, 22b can be stored in any way which is suitable for the computer program product 21.

Reference is now made to FIG. 6a illustrating a method for PDCCH power coordination according to an embodiment. The method is performed by a first transmission point 2a (hereinafter TP1) and a second transmission point 2b (hereinafter TP2). TP1 and TP2 are associated with a common physical cell identity (PCI). TP1 and TP2 may have partially different spatial coverage, i.e., the cells 8a, 8b of TP1 and TP2 may cover partially different geographical locations. Further, TP1 and TP2 are controlled by a network node 6. The network node schedules a first UE 4a (hereinafter UE1) on a first PDCCH allocating a first set of CCEs to UE1.

PDCCH power coordination is obtained by performing power adjustments on at least one CCE in the first set of CCEs allocated to UE1 and on at least one CCE in a second set of CCEs allocatable by a second PDCCH for the network node 6 to schedule at least a second UE 4b (hereinafter UE2). Particularly, the processing units 9 of TP1 and TP2 are arranged to, in a step S102, adjust power on at least one CCE in the first set of CCEs allocated to UE1. Hence, TP1 and TP2 both adjust power for UE1. Examples of such power adjustments will be provided below. Further, the processing unit 9 of TP1 is arranged to, in a step S104, adjust power on at least one CCE in the second set of CCEs. Hence TP1 adjusts power on UE2. Examples of such a power adjustment will be provided below. This enables the power on each CCE in at least one of the first set of CCEs and the second set of CCEs to be individually adjusted. Hence power may be adjusted on an individual CCE level, thereby providing improved PDCCH power coordination between TP1 and TP2.

The processing units 9 of TP1 and TP2 are arranged to, in a step S106, decrease the number of CCEs in the first set of CCEs allocated to UE1. This enables CCEs to be freed. Some freed CCEs may be used to enable at least one further UE to be scheduled by the network node 6 in at least one of the cell 8a and the cell 8b. Further, this decreasing of the number of CCEs may result in that the total number of CCEs required to schedule both UE1 and UE2 may be reduced. The decrease of the number of CCEs in the first set of CCEs allocated to UE1 is enabled by the power adjustments as performed in steps S102 and S104.

The network node may initially schedule UE2 on the second PDCCH allocating the second set of CCEs. Hence, the second set of CCEs may initially be allocated to UE2. Alternatively, the network node does not initially schedule UE2 on the second PDCCH allocating the second set of CCEs.

Each of the first set of CCEs and the second set of CCEs may comprise 1, 2, 4 or 8 CCEs. Hence, power may be adjusted on any of 1, 2, 4, or 8 CCEs allocated to UE1. Likewise, power may be adjusted on any of 1, 2, 4, or 8 CCEs allocated to UE2.

Reference is now made to FIG. 7a illustrating a method for PDCCH power coordination according to an embodiment. The method is performed by the network node 6. The network node 6 is arranged to control TP1 and TP2. The processing unit 15 of the network node 6 is arranged to, in a step S202, determine power adjustment of UE1 and UE2. Particularly, the network node 6 is arranged to control power adjustment on at least one CCE in the first set of CCEs allocated to UE1 and on at least one CCE in the second set of CCEs allocatable to UE2. The processing unit 15 of the network node 6 is arranged to, in a step S204, provide TP1 and TP2 with instructions as defined in steps S102, S104, and S106.

There may be different ways to perform the power adjustments in steps S102 and S104. Some of these adjustments involve only TP1; some of these adjustments involve only TP2; and some of these adjustments involve both TP1 and TP2. Two particular embodiments, called a first overall embodiment and a second overall embodiment, relating thereto will now be described in turn. More general embodiments relating to further details of PDCCH power coordination will then be disclosed. For both the first overall embodiment and the second overall embodiment as performed by TP1 and TP2 reference is made to the flowchart of FIG. 6*b*. For both the first overall embodiment and the second overall embodiment as performed by the network node 6 reference is made to the flowchart of FIG. 7*b*. Other figures and tables associated with the first overall embodiment and the second overall embodiment will be explicitly stated.

Different types of adjustments as performed in steps S102 and S104 and associated with a first overall embodiment associated with TP1 and TP2 will now be disclosed in further detail by means of an illustrative example.

For illustrative purposes it is assumed that both TP1 and TP2 have a total capacity of 16 CCEs and 16 PUs (where, without any loss of generality, one PU is a generic PDCCH Power Unit per CCE) available. For illustrative purposes it is further assumed that UE1 requires 4 CCEs and 4 PUs from TP1, and also 4 CCEs and 4 PUs from TP2. This corresponds to PSD levels 4/4=1.0 from both TPs. For illustrative purposes it is further assumed that UE2 requires 2 CCE and 2 PU from TP1. This corresponds to PSD level=1.0. It is furthermore assumed that UE2 not is heard by TP2. That is, UE2 is located outside the cell 8*b*. For illustrative purposes it is further assumed that other UEs are using 12 CCEs and 12 PUs in TP1, and 2 CCEs and 2 PUs in TP2. The total CCE and power allocation before PDCCH power adjustment of UE1 and UE2 is summarized in Table 1.

TABLE 1

Number of CCEs and power units (PU) allocated to UEs before PDCCH power adjustment.

|  | TP1 | | TP2 | |
| --- | --- | --- | --- | --- |
| Before | CCE | PU | CCE | PU |
| UE1 | 4 | 4 | 4 | 4 |
| UE2 | 0 | 0 | 0 | 0 |
| Others UEs | 12 | 12 | 2 | 2 |
| Total | 16 | 16 | 6 | 6 |

With this power setting for CCEs carrying PDCCH it is not possible to transmit PDCCH for UE2 due to UE1 and the other UEs already having consumed both the total number of CCEs and the total power budget for TP1.

In order to perform PDCCH power coordination TP1 decreases allocation to UE1 down to 2 CCEs and 2 PUs. According to this first overall embodiment the processing unit 9 of TP1 is thus arranged to, in an optional step S116*a*, decrease power on at least one CCE in the first set of CCEs carrying the first PDCCH for UE1 by TP1. To compensate for this TP2 needs to increase power to UE1 to 6.5 PUs. According to this first overall embodiment the processing unit 9 of TP2 is thus arranged to, in an optional step S116*b*, increase power on at least one CCE in the first set of CCEs carrying the first PDCCH for UE1 by TP2. For UE1 this corresponds to a power boost from PSD level of 4/4=1.0 to 6.5/2=3.25, i.e., approximately 5.1 dB. The same number of CCEs, 2 in this case, must be allocated for both TP1 and TP2. Thus there are 2 CCEs and 2 PUs available for UE2 from TP1. In this way it was possible to also support UE2. The total CCE and power allocation after PDCCH power adjustment of UE1 and UE2 is summarized in Table 2.

TABLE 2

Number of CCEs and power units (PU) allocated to UEs after PDCCH power adjustment.

|  | TP1 | | TP2 | |
| --- | --- | --- | --- | --- |
| After | CCE | PU | CCE | PU |
| UE1 | 2 | 2 | 2 | 6.5 |
| UE2 | 2 | 2 | 0 | 0 |
| Others UEs | 12 | 12 | 2 | 2 |
| Total | 16 | 16 | 4 | 8.5 |

According to a first overall embodiment associated with the network node 6, the processing unit 15 of the network node 6 is arranged to, in an optional step S214*a* and/or step S214*b*, provide instructions as defined in step S116*a*, and/or step S116*b* respectively.

Different types of adjustments as performed in steps S102 and S104 and associated with the second overall embodiment as performed by TP1 and/or TP2 will now be disclosed in further detail. The second overall embodiment is based on identifying a first set of UEs and a second set of UEs and treating UEs in the first set differently than UEs in the second set.

Particularly, according to this second overall embodiment the processing units 9 of TP1 and TP2 are arranged to, in an optional step S118, identify UEs capable of maintaining performance if assigned less power on at least one CCE in the first set of CCEs carrying the first PDCCH. These UEs are associated with a first set of UEs. The first set of UEs comprises at least UE1. Further, the processing units 9 of TP1 and TP2 are according to this second overall embodiment arranged to, in an optional step S120, identify UEs capable of reducing the number of allocated CCEs if assigned more power on at least one CCE in the second set of CCEs carrying the second PDCCH. These UEs are associated with a second set of UEs. The second set of UEs comprises at least UE2.

UEs which to perform adjustments on are then identified. This corresponds to identify sectors containing UEs from both sets. In general terms, a sector is a part of a cell 8*a*, 8*b*. According to this second overall embodiment the processing units 9 of TP1 and TP2 are therefore arranged to, in an optional step S122, identify sectors containing UEs from both the first set of UEs and the second set of UEs.

Adjustments may then be performed on UEs in the identified sectors. According to this second overall embodiment the processing units 9 of TP1 and TP2 are arranged to, in an optional step S124, adjust power on at least one CCE carrying PDCCH of UEs in the sectors. This adjustment comprises decreasing power on at least one CCE in the first set of CCEs carrying the first PDCCH of UEs in the first set of UEs. This adjustment further comprises increasing power on at least one CCE in the second set of CCEs carrying the second PDCCH of UEs in the second set of UEs.

There may be different ways to determine in which order the CCEs in the first set of CCEs carrying the first PDCCH of UEs in the first set of UEs should be power adjusted. Different examples within the second overall embodiment will now be described in turn.

As a first example, the CCEs may be power adjusted based on available PDCCH power reduction. According to this second overall embodiment the processing units 9 of TP1 and TP2 may thus be arranged to, in an optional step S126, decrease power on at least one CCE in the first set of CCEs carrying the first PDCCH of UEs in the first set of UEs in an order determined according to available PDCCH power reduction. Thereby UEs in the first set of UEs capable of having a high level of PDCCH power reduced may be power adjusted before UEs in the first set of UEs capable of having only a low level of PDCCH power reduced are power adjusted.

As a second example, the CCEs may be power adjusted based on the number of CCEs that are allocated to the UEs. According to this second overall embodiment the processing units 9 of TP1 and TP2 may thus be arranged to, in an optional step S128, decrease power on at least one CCE in the first set of CCEs carrying the first PDCCH of UEs in the first set of UEs in an order determined according to number of CCEs allocated to the UEs. Thereby UEs in the first set of UEs having a high number of CCEs allocated may be power adjusted before UEs in the first set of UEs having only a low number of CCEs allocated are power adjusted.

As a third example, the CCEs may be power adjusted based on priority. According to this second overall embodiment the processing units 9 of TP1 and TP2 may be arranged to, in an optional step S130, decrease power on at least one CCE in the first set of CCEs carrying the first PDCCH of UEs in the first set of UEs in an order determined according to a priority parameter. Thereby UEs in the first set of UEs capable of having a low priority may be power adjusted before UEs in the first set of UEs having a high priority are power adjusted (if the power adjustment involves decreasing power for UEs in the first set of UEs). The priority parameter may be determined by the network node 6.

At least two of the first example, the second example, and the third example may be combined. That is, the CCEs may be power adjusted based on at least one of available PDCCH power reduction, the number of CCEs that are allocated to the UEs, and priority.

Figure 8:
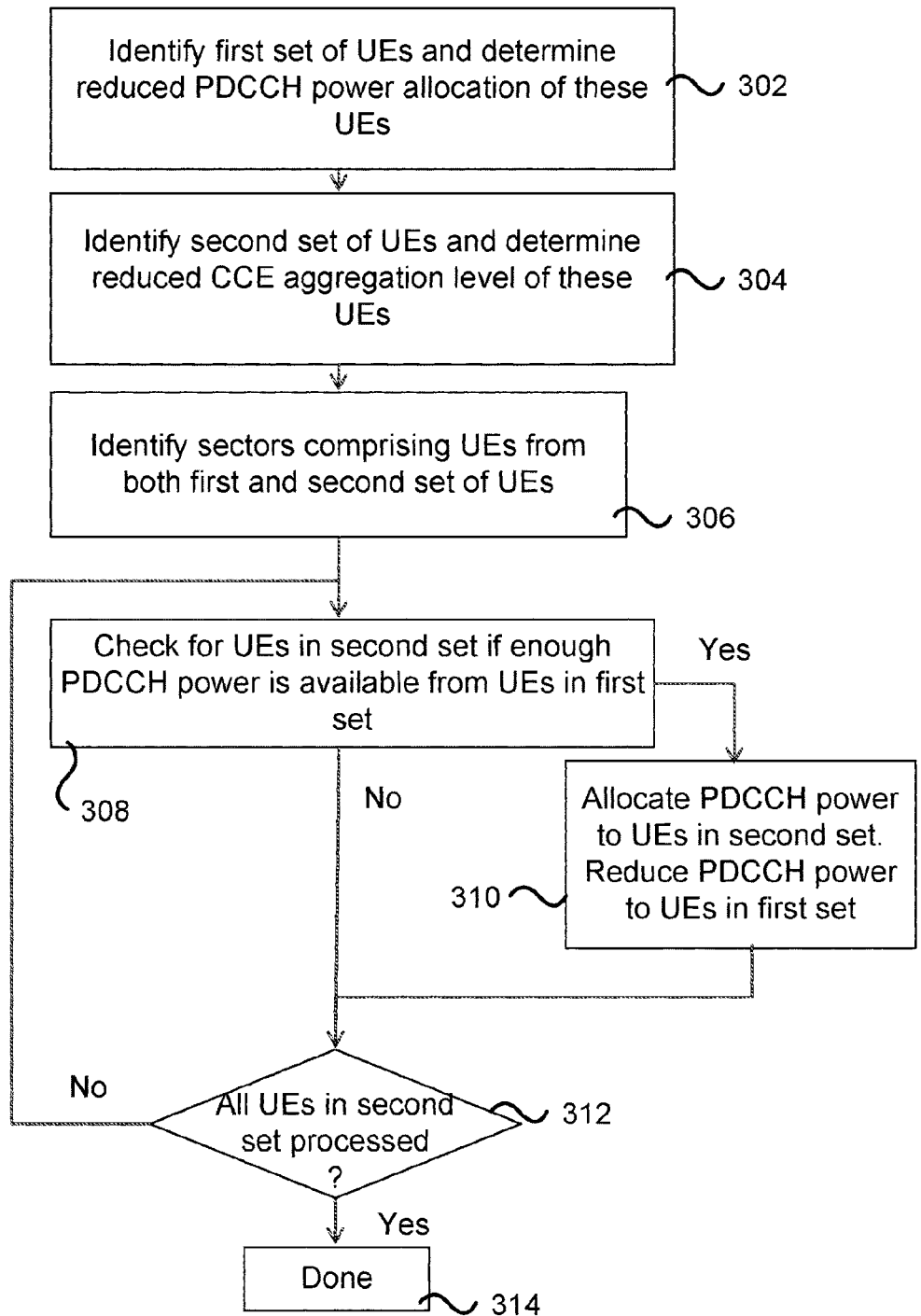

An illustrative example for adjusting as performed in steps S102 and S104 for the second overall embodiment as performed by TP1 and/or TP2 will be provided next with reference to the flowchart of FIG. 8.

Step S302: Identify a first set of UEs that can maintain their performance if less PDCCH power is allocated. Register the possible PDCCH power reduction for the first set of UEs for each sector where the UEs of the first set of UEs are located. One way to implement step S302 is to perform step S118.

Step S304: Identify a second set of UEs that can have a reduced CCE aggregation level if more PDCCH power is allocated. Register the required PDCCH power increase for the second set of UEs for each sector where the UEs of the second set of UEs are located. One way to implement step S304 is to perform step S120.

Step S306: Identify candidate sectors for PDCCH power coordination by finding sectors comprising UEs from both the first set of UEs and the second set of UEs. One way to implement step S306 is to perform step S122.

Step S308: For a UE in the second set of UEs, check if for all cells where it is present if there is enough PDCCH power available from UEs in the first set of UEs to cover the PDCCH power increase for this UE. If there is enough power, step S310 is entered. If there is not enough power step S312 is entered.

Step S310: Allocate the required PDCCH power from each sector to the UE in the second set of UEs. Reduce the corresponding PDCCH from a UE in the first set of UEs in the same sector. One way to implement step S310 is to perform above disclosed step S124. There may be different ways to determine which UEs from the first set of UEs to select in each sector. For example, the UE from the first set of UEs in each sector may be selected as the UE with the lowest available PDCCH power reduction but still fulfilling the request for PDCCH power for UEs in the second set of UEs (thus leaving higher PDCCH power available for other UEs in the second set of UEs yet not power adjusted). Further examples of which UE in the first set of UEs are given with reference to the power adjustments as performed in steps S126-S130.

Step S312: Check if all UEs in the second set of UEs have been processed in step S310. If yes: go to step S314. If no: go to step S308 and select a yet not processed UE in the second set of UEs.

Step S314: All UEs in the second set of UEs have been processed. Thus, all UEs in the second set of UEs have been allocated more PDCCH power.

Steps 302 and 304 may be performed jointly. Steps 308 and 310 may be performed jointly using a known joint optimization scheme. Steps S302-S314 may be performed repeatedly in order to perform further PDCCH power coordination.

According to a second overall embodiment associated with the network node 6, the processing unit 15 of the network node 6 is arranged to, in an optional step S216, provide instructions as defined in step S118, to, in an optional step S218, provide instructions as defined in step S120, to, in an optional step S220, provide instructions as defined in step S122, to, in an optional step S222, provide instructions as defined in step S124. According to this second overall embodiment the processing unit 15 of the network node 6 may be arranged to, in an optional step S224, provide instructions as defined in step S126, to, in an optional step S226, provide instructions as defined in step S128, and/or to, in an optional step S228, provide instructions as defined in step S130.

Further embodiments relating to PDCCH power coordination will now be disclosed. The below disclosed further embodiments may be combined with the above disclosed first overall embodiment and/or the above disclosed second overall embodiment. Reference is again made to FIGS. 6*b* and 7*b* illustrating methods for PDCCH power coordination according to further embodiments as performed by TP1 and TP2 (as in the flowchart of FIG. 6*b*) and the network node 6 (as in the flowchart of FIG. 7*b*). For example, by reducing the CCE aggregation level (i.e., reducing the number of allocated CCEs) and/or the PDCCH power for UE1 in a cell 8*a*, this reduced CCE aggregation level and/or PDCCH power can instead be allocated to UE2 in the same cell 8*a* or to a further UE in cell 8*a*. According to an embodiment the processing unit 9 of TP1 is thus arranged to, in an optional step S108*a*, decrease power on at least one CCE in the first set of CCEs carrying the first PDCCH for UE1. According to an embodiment the processing unit 9 of TP1 is arranged, in an optional step S108*b*, to increase power on at least one CCE in the second set of CCEs carrying the second PDCCH for UE2. According to an embodiment the processing unit 15 of the network node 6 is arranged to, in an optional step S206a and/or S206b, provide instructions as defined in step S108a and/or S108b, respectively.

For example, in a case both CCE and PDCCH power is made available, CCEs and PDCCH power to UE2 may be allocated (for example, if neither were previously available). According to an embodiment the processing unit 9 of TP1 is arranged to, in an optional step S114a, assign power on at least one CCE in the second set of CCEs carrying the second PDCCH to UE2. According to an embodiment the processing unit 9 of TP1 is arranged, in an optional step S114b, to assign CCEs to UE2. According to an embodiment the processing unit 15 of the network node 6 is arranged to, in an optional step S212a and/or S212b, provide instructions as defined in step S114a and/or S114b, respectively.

For example, in a case PDCCH power is made available, PDCCH power may be boosted, thereby reducing the number of CCEs required for UE2, hence freeing up CCEs for yet another UE. Particularly, according to an embodiment the processing unit 9 of TP2 is arranged to, in an optional step S110a, increase power on at least one CCE in the first set of CCEs carrying the first PDCCH for UE1 and/or, in an optional step Snob, to decrease the number of CCEs in the first set of CCEs allocated to UE1. According to an embodiment the processing unit 15 of the network node 6 is arranged to, in an optional step S208a and/or S208b, provide instructions as defined in step S110a and/or Snob, respectively. Additionally or alternatively, the processing unit 9 of TP1 may be arranged to, in an optional step S112a, increase power on at least one CCE in the second set of CCEs carrying the second PDCCH for UE2 and/or, in an optional step S112b, to decrease the number of CCEs in the second set of CCEs allocated to UE2. According to an embodiment the processing unit 15 of the network node 6 is arranged to, in an optional step S210a and/or S210b, provide instructions as defined in steps S112a and/or S112b, respectively.

There may be different ways to determine that PDCCH power adjustment of UE1 and UE2 should be performed. Different embodiments relating thereto will now be described in turn. The reduction of PDCCH power for UE1 in the sector of interest can be due to several reasons. According one embodiment the reduction of PDCCH power to UE1 from TP1 in cell 8a is compensated by an increase of PDCCH power to UE1 from TP2 in cell 8b. According to one embodiment the PDCCH power to UE1 is over allocated in cell 8a due to all UEs in cell 8a having been assigned a common initial power spectral density (PSD) level and the CCE aggregation level is selected in a conservative manner by selecting the next higher CCE aggregation level fulfilling the required SINR. Thus, according to an embodiment UE1 and UE2 are initially assigned a common PSD level.

According to an embodiment, at least the system bandwidth, number of antennas, cyclic prefix length and PHICH resource size are kept fixed in the communications network 1a, 1b. According to an embodiment the CFI is equal in different sectors of a shared cell in order to avoid interference between PDSCH and PDCCH; otherwise a corresponding restriction may be imposed. In general terms it may also be required that the sectors are time aligned.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Abbrevations

CCE: Control Channel Element
CFI: Control Format Indicator
DCI: Downlink Control Information
DL: Down Link
LTE: Long Term Evolution
MCS: Modulation and Coding Scheme
OFDM: Orthogonal Frequency Division Multiplexing
PCI: Physical Cell ID
PDCCH: Physical Downlink Control Channel
PDSCH: Physical Downlink Shared Channel
PSD: Power Spectral Density
PUCCH: Physical Uplink Control Channel
QoS: Quality of Service
RBS: Radio Base Station
RE: Resource Element
SC-FDMA: Single Carrier Frequency Division Multiple Access
TP: Transmission Point
TTI: Transmission Time Interval
UE: User Equipment
UL: Up Link

The invention claimed is:

1. A method for physical downlink control channel, PDCCH, power coordination, the method being performed by a first transmission point, TP1, and a second transmission point, TP2, associated with a common physical cell identity, PCI, and controlled by a network node, the network node scheduling a first user equipment, UE1, on a first PDCCH allocating a first set of control channel elements, CCEs, comprising the steps of:
   adjusting, by TP1 and TP2, power on at least one CCE in the first set of CCEs allocated to UE1;
   adjusting, by TP1, power on at least one CCE in a second set of CCEs, said second set of CCEs being allocatable by a second PDCCH for the network node to schedule at least a second user equipment, UE2; and
   decreasing, by TP1 and TP2, number of CCEs in the first set of CCEs allocated to UE1.

2. The method according to claim 1, wherein UE2 initially is scheduled on said second PDCCH allocating said second set of CCEs by the network node.

3. The method according to claim 2, wherein said adjusting by TP1 comprises:
   increasing power on at least one CCE in the second set of CCEs carrying the second PDCCH for UE2; and
   decreasing number of CCEs in the second set of CCEs allocated to UE2.

4. The method according to claim 1, wherein UE2 initially is not scheduled on said second PDCCH by the network node.

5. The method according to claim 1, wherein said adjusting by TP1 comprises:
   decreasing power on at least one CCE in the first set of CCEs carrying the first PDCCH for UE1; and
   increasing power on at least one CCE in the second set of CCEs carrying the second PDCCH for UE2.

6. The method according to claim 1, wherein said adjusting by TP2 comprises:

increasing power on at least one CCE in the first set of CCEs carrying the first PDCCH for UE1.

7. The method according to claim 1, wherein said adjusting by TP1 comprises:
assigning power on at least one CCE in the second set of CCEs carrying the second PDCCH to UE2; and
assigning CCEs to UE2.

8. The method according to claim 1, wherein said adjusting comprises:
decreasing power on at least one CCE in the first set of CCEs carrying the first PDCCH for UE1 by TP1; and
increasing power on at least one CCE in the first set of CCEs carrying the first PDCCH for UE1 by TP2.

9. The method according to claim 1, wherein said adjusting comprises:
identifying UEs capable of maintaining performance if assigned less power on at least one CCE in the first set of CCEs carrying the first PDCCH and associating these UEs with a first set of UEs, said first set of UEs comprising UE1;
identifying UEs capable of reducing number of allocated CCEs if assigned more power on at least one CCE in the second set of CCEs carrying the second PDCCH and associating these UEs with a second set of UEs, said second set of UEs comprising UE2;
identifying sectors containing UEs from both said first set of UEs and said second set of UEs; and
adjusting power on at least one CCE carrying PDCCH of UEs in said sectors by decreasing power on at least one CCE in the first set of CCEs carrying the first PDCCH of UEs in said first set of UEs and increasing power on at least one CCE in the second set of CCEs carrying the second PDCCH of UEs in said second set of UEs.

10. The method according to claim 9, wherein said step of adjusting PDCCH power of UEs in said sectors comprises:
decreasing power on at least one CCE in the first set of CCEs carrying the first PDCCH of UEs in said first set of UEs in an order determined according to available PDCCH power reduction.

11. The method according to claim 9, wherein said step of adjusting PDCCH power of UEs in said sectors comprises:
decreasing power on at least one CCE in the first set of CCEs carrying the first PDCCH of UEs in said first set of UEs in an order determined according to number of CCEs allocated to the UEs.

12. The method according to claim 9, wherein said step of adjusting PDCCH power of UEs in said sectors comprises:
decreasing power on at least one CCE in the first set of CCEs carrying the first PDCCH of UEs in said first set of UEs in an order determined according to a priority parameter.

13. The method according to claim 12, wherein said priority parameter is determined by said network node.

14. The method according to claim 1, wherein UE1 and UE2 initially are assigned a common power spectral density (PSD) level.

15. The method according to claim 1, wherein each of the first set of CCEs and the second set of CCEs comprises one of 1, 2, 4 or 8 CCEs.

16. A method, in a network node, for physical downlink control channel, PDCCH, power coordination of a first transmission point, TP1, and a second transmission point, TP2, wherein TP1 and TP2 are associated with a common physical cell identity, PCI, and are controlled by a network node, the network node scheduling a first user equipment, UE1, on a first PDCCH allocating a first set of control channel elements, CCEs, the method comprising the steps of:
determining power adjustment of UE1 and at least a second user equipment, UE2;
providing TP1 and TP2 with instructions to
adjust, by TP1 and TP2, power on at least one CCE in the first set of CCEs allocated to UE1;
adjust, by TP1, power on at least one CCE in a second set of CCEs to UE2, said second set of CCEs being allocatable by a second PDCCH for the network node to schedule at least UE2; and
decrease, by TP1 and TP2, number of CCEs in the first set of CCEs allocated to UE1.

17. A system for physical downlink control channel, PDCCH, power coordination, the system comprising a first transmission point, TP1, and a second transmission point, TP2, associated with a common physical cell identity, PCI, and arranged to be controlled by a network node, the network node arranged to schedule a first user equipment, UE, on a first PDCCH allocating a first set of control channel elements, CCEs, wherein TP1 and TP2 each comprises a processing unit, and wherein:
the processing units of TP1 and TP2 are arranged to adjust power on at least one CCE in the first set of CCEs allocated to UE1;
the processing unit of TP1 is arranged to adjust power on at least one CCE in a second set of CCEs to UE2, said second set of CCEs being allocatable by a second PDCCH for the network node to schedule at least a second user equipment, UE2; and
the processing units of TP1 and TP2 are arranged to decrease number of CCEs in the first set of CCEs allocated to UE1.

18. A network node for physical downlink control channel, PDCCH, power coordination of a first transmission point, TP1, and a second transmission point, TP2, wherein TP1 and TP2 are associated with a common physical cell identity, PCI, and are arranged to be controlled by a network node, the network node being arranged to schedule a first user equipment, UE, on a first PDCCH allocating a first set of control channel elements, CCEs, the network node comprising a processing unit arranged to:
determine power adjustment of UE1 and at least a second user equipment, UE2;
provide TP1 and TP2 with instructions to
adjust, by TP1 and TP2, power on at least one CCE in the first set of CCEs allocated to UE1;
adjust, by TP1, power on at least one CCE in a second set of CCEs, said second set of CCEs being allocatable by a second PDCCH for the network node to schedule at least UE2; and
decrease, by TP1 and TP2, number of CCEs in the first set of CCEs allocated to UE1.

19. A non-transitory computer readable medium containing a computer program for physical downlink control channel, PDCCH, power coordination, the computer program comprising computer program code which, when run on a first transmission point, TP1, and a second transmission point, TP2, associated with a common physical cell identity, PCI, and adaptable to be controlled by a network node, the network node being arranged to schedule a first user equipment, UE1, on a first PDCCH allocating a first set of control channel elements, CCEs, causes TP1 and TP2 to:
adjust, by TP1 and TP2, power on at least one CCE in the first set of CCEs allocated to UE1;

adjust, by TP1, power on at least one CCE in a second set of CCEs, said second set of CCEs being allocatable by a second PDCCH for the network node to schedule at least a second user equipment, UE2; and decrease, by TP1 and TP2, number of CCEs in the first set of CCEs allocated to UE1.

20. A non-transitory computer readable medium containing a computer program for physical downlink control channel, PDCCH, power coordination of a physical downlink control channel, PDCCH, power coordination of a first transmission point, TP1, and a second transmission point, TP2, wherein TP1 and TP2 are associated with a common physical cell identity, PCI, and adaptable to be controlled by a network node, the network node being arranged to schedule a first user equipment, UE1, on a first PDCCH allocating a first set of control channel elements, CCEs, the computer program comprising computer program code which, when run on the network node, causes the network node to:

determine power adjustment of UE1 and at least a second user equipment, UE2;

provide TP1 and TP2 with instructions to
adjust, by TP1 and TP2, power on at least one CCE in the first set of CCEs allocated to UE1;
adjust, by TP1, power on at least one CCE in a second set of CCEs, said second set of CCEs being allocatable by a second PDCCH for the network node to schedule at least UE2; and
decrease, by TP1 and TP2, number of CCEs in the first set of CCEs allocated to UE1.

* * * * *